United States Patent [19]

Buzzi

[11] 4,063,461
[45] Dec. 20, 1977

[54] DEVICE FOR DETERMINING THE ANGULAR UNBALANCE POSITION IN A BALANCING MACHINE FOR ROTATING PIECES

[76] Inventor: Luigi Buzzi, Via Risorgimento 60, Mandello del Lario (Como), Italy

[21] Appl. No.: 724,375

[22] Filed: Sept. 17, 1976

[30] Foreign Application Priority Data

Oct. 27, 1975 Italy .................................. 7225/75

[51] Int. Cl.² ............................................ G01M 1/22
[52] U.S. Cl. .................................................... 73/462
[58] Field of Search ................ 73/462, 464; 235/151.3

[56] References Cited

U.S. PATENT DOCUMENTS 3,732,737  5/1973  Forster .................................. 73/462

FOREIGN PATENT DOCUMENTS 24,274  3/1967  Japan ...................................... 73/462

*Primary Examiner*—James J. Gill
*Attorney, Agent, or Firm*—Karl W. Flocks

[57] ABSTRACT

The present invention relates to a device for determining the angular position in a balancing machine for rotating pieces. The device according to the invention basically comprises means for counting memorizing and visualizing the number of constant frequency pulses which are delivered by a first pulse generator between a reference moment at which a second pulse generator delivers a reference pulse representative of a predetermined angular position of the rotating piece and the moment at which a vibration indicator delivers a pulse indicative of the angular unbalance position.

The number of pulses counted between said moments represents the phase difference between the unbalance position and the predetermined angular position and is therefore indicative of the unbalance position.

5 Claims, 8 Drawing Figures

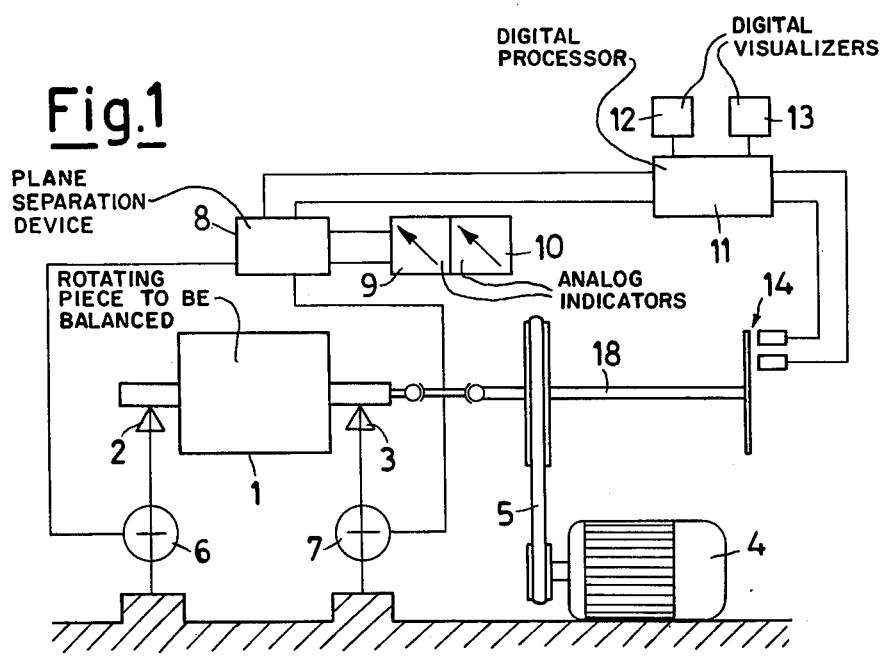
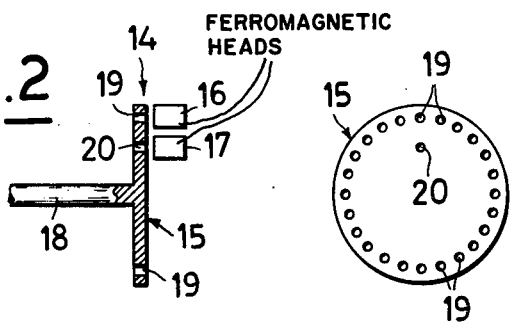
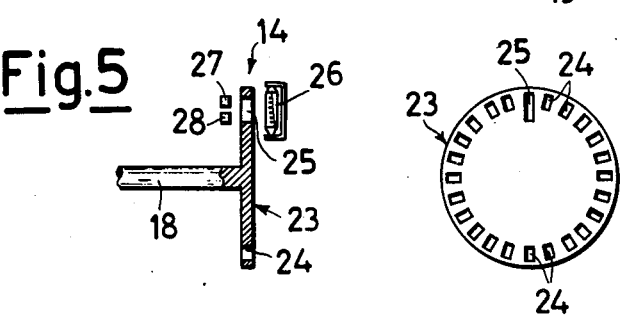
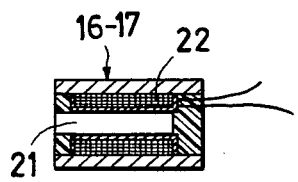

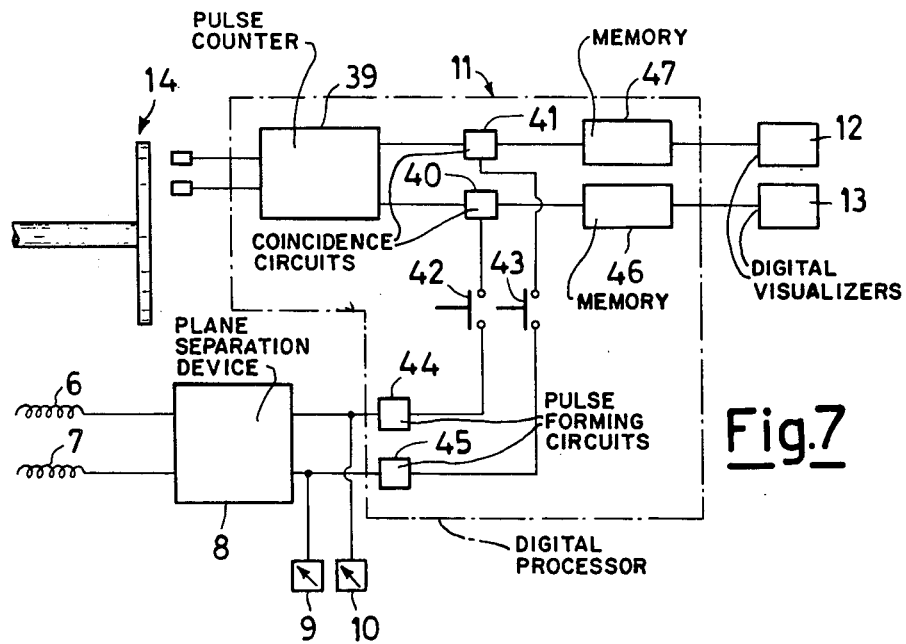
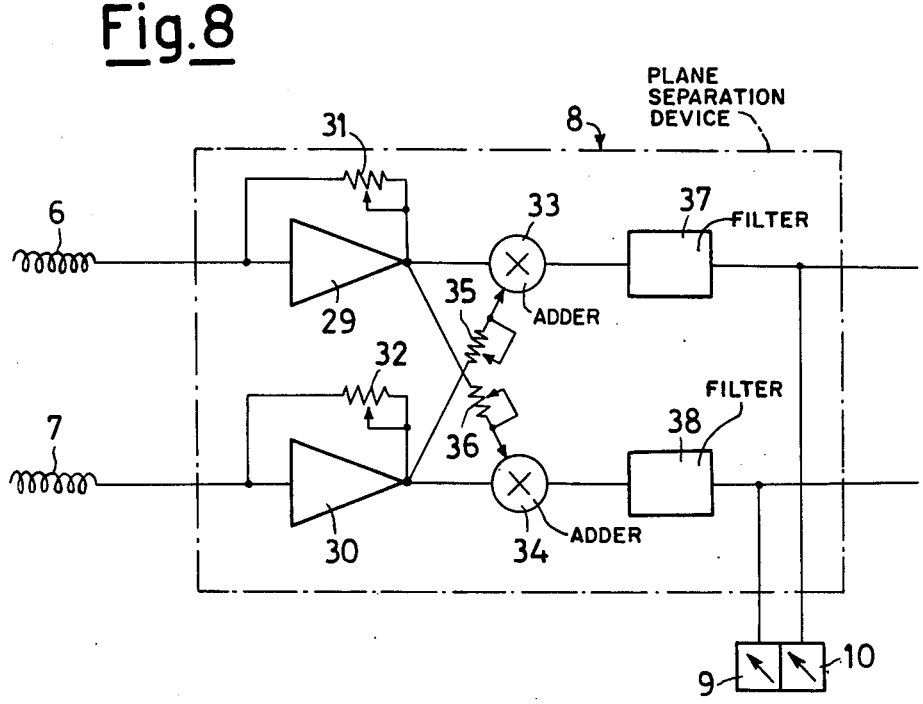

DEVICE FOR DETERMINING THE ANGULAR UNBALANCE POSITION IN A BALANCING MACHINE FOR ROTATING PIECES

This invention relates to a device for determining the angular unbalance position in a balancing machine for rotating pieces.

In known balancing machines, the angular unbalance position is obtained using a phase generator consisting of a permanent magnet which rotates together with the piece within a fixed or mobile stator, or a stroboscopic lamp governed by the support vibrations and illuminating a mark on the rotating piece, or a photoelectric cell or photoresistance which is activated by a mark.

Another known system is to magnetise a small area of a disc of appropriate material in a well defined position linked to the unbalance position so as to be able to determine the angular unbalance position when the machine is at rest by using a magnetic probe.

The means used up to the present time have certain disadvantages, including the need for manual determination in phase generator systems, or, in the case of optical systems, inaccuracy due to the subjective measurement of the image and the visual tiredness of the operator, or in the case of magnetic devices, excessive dependence of the measuring probes on temperature.

The object of the present invention is to provide a device for determining the angular unbalance position, which does not require manual intervention by the operator and which is able to supply the required indication completely automatically and with maximum and constant precision.

According to the invention, this object is attained by a device comprising first pulse generator means associated with the rotating piece to be balanced in such a manner as to generate a succession of pulses at a constant frequency depending on the rotational speed of the piece, second pulse generator means associated with the rotating piece to be balanced in such a manner as to generate a pulse each time the piece passes through a predetermined angular position, pulse counter means associated with said first and second pulse generator means in such a manner as to count the constant frequency pulses generated by said first pulse generator means and be periodically zeroed by the pulse generated by said second pulse generator means, at least one vibration indicator means associated with the rotating piece in such a manner as to generate an unbalance indication signal each time the piece passes through an angular unbalance position, pulse formation means associated with said vibration indicator means in such a manner as to convert said unbalance indication signal into a pulse the position in time of which is indicative of the angular unbalance position of the piece to be balanced, memory means, coincidence means associated with said pulse counter means and with said pulse formation means in such a manner as to determine and to transfer to said memory means that state of counting of said counter means which coincides with said pulse indicative of the angular unbalance position, and digital visualiser means associated with said memory means in such a manner as to provide visual representation of said memorised state of counting.

In other words, the device according to the invention is based substantially on the principle of counting, memorising and visualising the number of constant frequency pulses which arise between a reference moment corresponding to a predetermined angular position of the rotating piece, and the moment of generation of the pulse indicative of the angular unbalance position. The number of pulses counted between said moments clearly represents the difference in phase between the unbalance position and the predetermined angular position, and is therefore indicative of the unbalance position.

As this is a completely automatic digital device, it is evidently completely free from those errors or indeterminations which arise in known devices through human action or changes in environmental conditions.

The characteristics of the present invention will be more evident with reference by way of example to the accompanying drawings in which:

FIG. 1 is the general schematic of a balancing machine with two planes of correction, incorporating a device according to the invention;

FIG. 2 is a partially sectional side view of a first example of pulse generator means associated with the piece to be balanced, in which a perforated disc and two ferromagnetic heads are used;

FIG. 3 is a front view of the perforated disc of FIG. 2;

FIG. 4 is an axial section through one of the ferromagnetic heads of FIG. 2;

FIG. 5 is a partially sectional side view of a second example of said pulse generator means, in which a perforated disc and a photoelectric cell system are used;

FIG. 6 is a front view of the perforated disc of FIG. 5;

FIG. 7 shows, in greater detail, one specific embodiment of the device according to the invention as represented in FIG. 1;

FIG. 8 is one practical example of a device for separating the planes of correction, and incorporated in the device of FIG. 7.

In FIG. 1, the rotating piece to be balanced, indicated by the reference numeral 1, is supported by two supports 2 and 3 and is rotated by a motor 4 through a belt drive 5.

Suitable vibration indicator devices 6 and 7 of known type are associated with the two supports 2 and 3, and operate in such a manner as to substantially indicate unbalances in different planes and to generate thereat respective unbalance indication signals.

These latter are fed to a device 8 which separates the planes of correction (i.e. each of the two signals free from the influence of the vibrations in the other plane) and feeds respective unbalance signals to two instruments 9 and 10 which measure and provide an analogue indication of the unbalance value.

One practical embodiment of the device 8 is shown in FIG. 8, and comprises two operational amplifiers 29 and 30 (one for each signal originating from the vibration indicators 6 and 7) provided with respective adjustable feedback resistors 31 and 32. A respective adder 33, 34 is disposed at the output of each of the two amplifiers 29 and 30, and computes the algebraic sum of the output signal from the respective amplifier and a signal derived from the other amplifier through a calibration resistor 35, 36. Said algebraic sum provides separation of the planes of correction, as required. Two filters 37 and 38 are provided to eliminate parasite signals.

The correctly separated unbalance signals which leave the device 8 are also fed to a digital processor 11, where they are compared with suitable reference signals indicative of the speed and phase of rotation of the piece 1, so as to provide digital signals indicative of the unbalance position for digital visualisers 12 and 13.

Said reference signals are provided by pulse generator means 14 which are associated with the rotating piece 1 in such a manner as to provide, at each revolution thereof, a succession of constant frequency pulses indicative of the speed of rotation of the piece, and a single pulse indicative of the passage of the piece through a predetermined angular position.

One practical embodiment of said pulse generator means is shown in FIGS. 2, 3 and 4, and comprises a perforated disc 15 with two ferromagnetic heads 16 and 17. The disc 15 is keyed onto a shaft 18 rotating rigidly and coaxially with the piece 1, and is traversed by a circumferential set of holes 19 and a single hole 20 radially close to the disc axis. The ferromagnetic head 16 cooperates with the set of holes 19, to emit a pulse each time a hole 19 passes in front of it, so generating for each revolution of the disc 15 and consequently of the piece 1 a succession of pulses of constant frequency depending on the speed of rotation of the piece. The ferromagnetic head 17 cooperates with the single hole 20, to emit a pulse each time the hole 20 passes in front of it, and thus periodically generate a pulse which indicates the passage of the piece 1 through a predetermined angular position. The ferromagnetic heads 16 and 17 are for example formed as shown in FIG. 4, i.e. they comprise a permanent magnet 21 inside an electric winding 22.

The pulse generator means shown by way of example in FIGS. 5 and 6 are basically analogous, but are of optoelectrical type. In this case a perforated disc 23 keyed onto a shaft 18 rotating rigidly and coaxially with the piece 1 is traversed by a circumferential set of apertures 24, one only of which, indicated by 25, is of double radial length. A light source 26 illuminates one at a time both the small apertures 24 and the large aperture 25. On the other side of the disc 23 there are two photosensitive elements 27 and 28, the first of which is illuminated by the light source 26 each time a small aperture 24 passes between the source and the photosensitive elements (and therefore several time, at constant frequency, for each revolution of the disc 23 and piece 1), while the second is illuminated by the light source 26 only when the large aperture 25 passes between the source and the photosensitive elements (and therefore once per revolution, as the piece 1 passes through a predetermined angular position).

The pulse generator means 14 may also consist of other systems based on slightly different principles, for example including sliding contacts which sequentially intercept insulated and conducting areas.

The digital processor 11 is shown in greater detail in FIG. 7, and comprises a pulse counter 39 associated with pulse generator means 14 in such a manner as to count the succession of constant frequency pulses fed to it by the generator means 16 or 27, and be periodically zeroed by the single pulse fed to it at each revolution by the generator means 17 or 28.

The state of counting of the counter 39 is made available at the input of two coincidence circuits 40 and 41 (one for each plane of correction), to which, when respective possibly integrated switches 42 and 43 close, periodic pulses arrive indicating the angular unbalance positions of the rotating piece, which two pulse formation circuits 44 and 45 derive from the unbalance signals leaving the plane separation device 8.

If any state of counting of the counter 39 coincides with an unbalance pulse produced by one of the pulse formers 44 and 45, said state of counting is transferred into a respective memory 46, 47, with which a respective digital visualiser 12, 13 is associated.

The general operation of the balancing machine shown in FIG. 1 with the relative device according to the invention incorporating a digital processor 11 as shown in FIG. 7 and pulse generator means of the type shown in FIGS. 2–4 or in FIGS. 5 and 6, is as follows. On rotation of the piece 1, the pulse generator means 14 supply the counter 39 with a succession of pulses of constant frequency indicative of the speed of rotation of the piece, and, for each revolution of this latter, a single pulse indicative of the passage of the piece through a predetermined angular position. The counter 39 counts the pulses of said succession and is periodically zeroed by said single pulse, because of which its continuously variable and periodically zeroed state of counting indicates the angular distance of the piece 1 from the said predetermined angular position.

Meanwhile, the vibration indicators 6 and 7 sense the unbalance of the piece 1 and produce respective analogue unbalance signals for which the device 8 separates the planes of correction and which the pulse formers 44 and 45 convert into respective time position pulses corresponding to the angular position of the unbalance which has been sensed.

If the switches 42 and 43 are closed, said pulses indicative of the angular unbalance position are able to reach the coincidence circuits 40 and 41, where they produce transfer into the memory, and corresponding digital visualisation, of the counting states of the counter 39 which coincide with the appearance of said pulses.

The figures memorised in the memories 46 and 47, and visualised on the digital indicators 12 and 13, evidently represent the angular distance between the unbalance positions determined by the indicators 6 and 7 and the predetermined angular position determining the generation of the zeroing pulse of the counter 39. The numerical values shown on the visualisers 12 and 13 therefore constitute an effective and exact evaluation of the angular unbalance position of the piece 1.

The figures memorised in the memories 46 and 47 are updated for each revolution of the piece 1 until the opening of the switches 42 and 43. At that point the unbalance position pulses cease to reach the coincidence circuits 40 and 41, and the previously measured and visualised values are put into static memory.

The embodiment shown in the drawings relates to the most frequent case of a balancing machine with two planes of correction. However there are substantially no changes where there is only one plane of correction. The device 8 would be superfluous, and there would be only one vibration indicator 6 or 7, one pulse former 44 or 45, one coincidence circuit 40 or 41, one memory 46 or 47, etc.

What is claimed is:

1. A device for determining the angular unbalance position in a balancing machine for rotating pieces comprising first pulse generating means, associated with the rotating piece to be balanced, to generate a succession of pulses at a constant frequency depending on the rotational speed of the piece;

second pulse generating means, associated with the rotating piece to be balanced, to generate a pulse each time the rotating piece passes through a predetermined angular position;

a continuously counting pulse counter means connected to both said first and second pulse generating means to count the constant frequency pulses generated by said first pulse generating means and to be periodically zeroed by the pulse generated by said second pulse generating means;

at least one vibration indicator means associated with the rotating piece to generate an unbalance indicator signal each time the rotating piece passes through an angular unbalance position;

pulse formation means connected to said vibration indicator means to convert said unbalance indication signal into a pulse, the position in time of which is indicative of the angular unbalance position of the rotating piece to be balanced;

memory means;

coincidence circuit means connected to said pulse counter means, said memory means, and to said pulse formation means, to determine and to transfer to said memory means that state of counting of said pulse counter means which coincides with said pulse indicative of the angular unbalance position;

and digital visualizer means connected to said memory means to provide visual representation of said memorized state of counting.

2. The device of claim 1 further characterized by switch means connected between said pulse formation means and said coincidence circuit means to allow updating of said memory means for each revolution of the rotating piece while said switch means are kept closed.

3. A device as claimed in claim 1, wherein said first and second pulse generating means comprise a disc rotating rigidly with the piece and comprising a circumferential succession of apertures and a single aperture outside said succession, a first sensitive element being provided to cooperate with said succession of apertures to generate a corresponding succession of pulses for each revolution of said disc, and a second sensitive element being provided to cooperate with said single aperture to generate a single impulse for each revolution of said disc.

4. A device as claimed in claim 3, wherein said sensitive elements consist of ferromagnetic heads.

5. A device as claimed in claim 3, wherein said sensitive elements consist of photoelectric cell elements activated by a light source disposed on the other side of said disc.

* * * * *